A. F. ROCKWELL.
VARIABLE SPEED COASTING AND BRAKING HUB.
APPLICATION FILED MAY 13, 1904.
962,245.
Patented June 21, 1910.
2 SHEETS—SHEET 2.
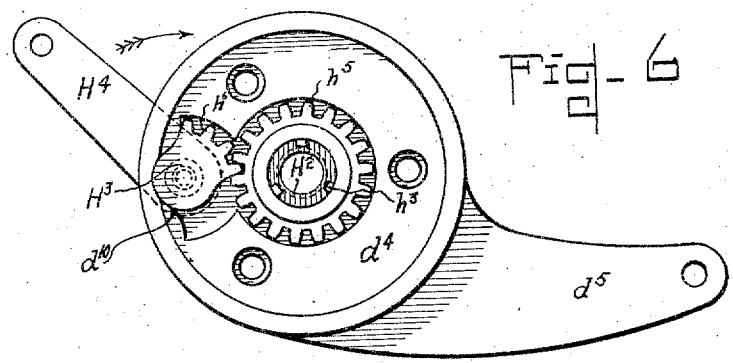
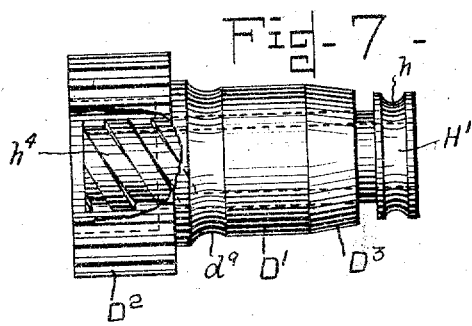
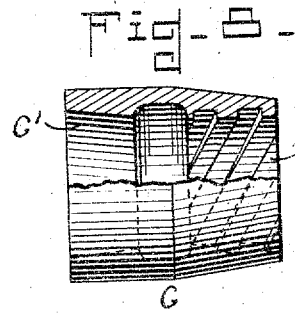
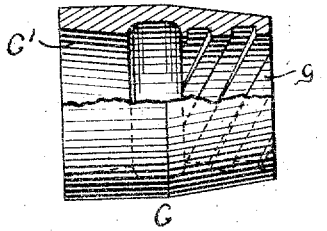

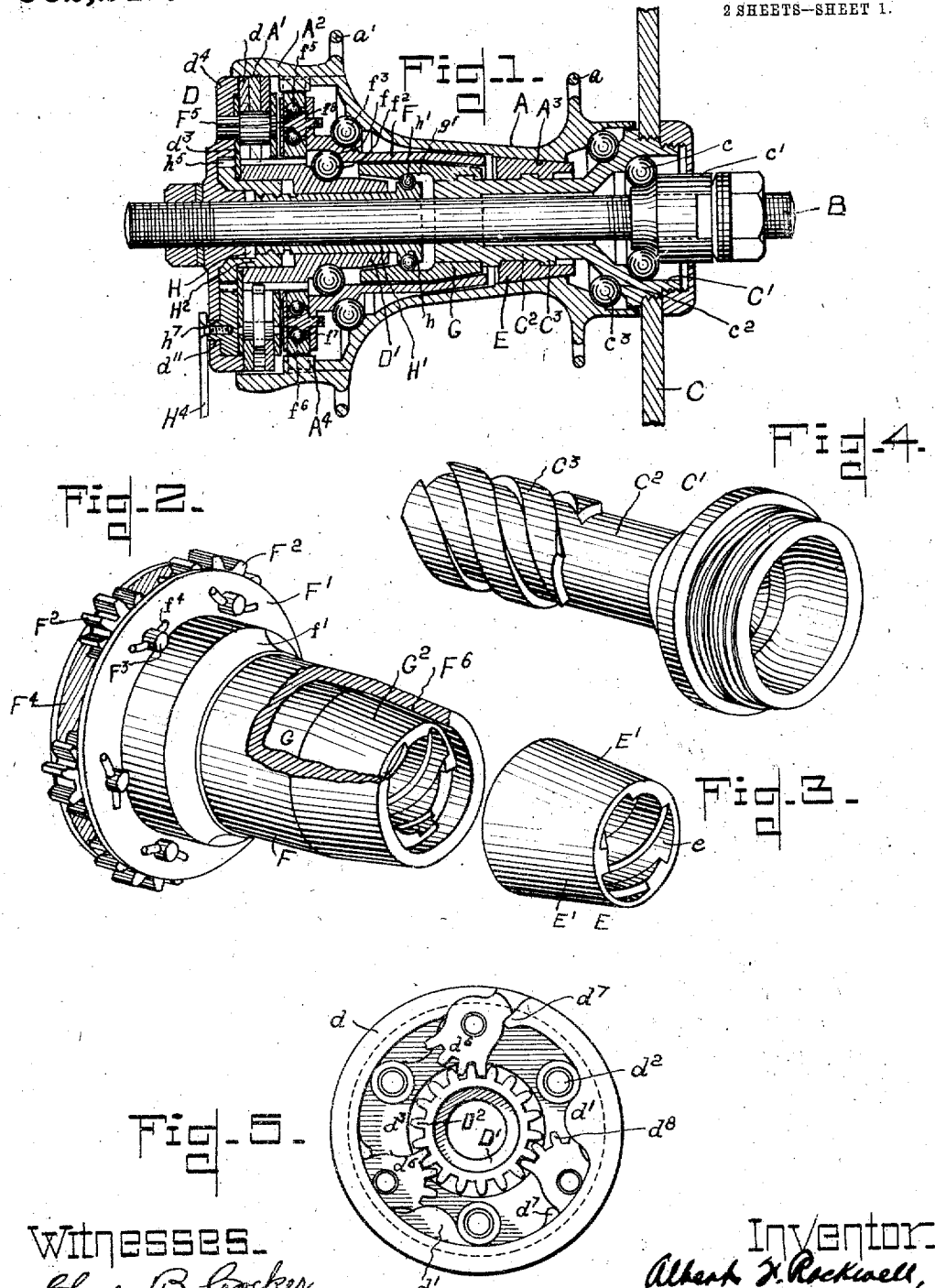

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL CONNECTICUT, A CORPORATION OF CONNECTICUT.

VARIABLE-SPEED COASTING AND BRAKING HUB.

962,245.  Specification of Letters Patent.  Patented June 21, 1910.

Application filed May 13, 1904.  Serial No. 207,758.

*To all whom it may concern:*

Be it known that I, ALBERT F. ROCKWELL, a citizen of the United States, residing at Bristol, in the county of Hartford and State of Connecticut, have invented certain new and useful Improvements in Variable-Speed Coasting and Braking Hubs; and I do hereby declare the following to be a full, clear, and exact description of the invention, such as will enable others skilled in the art to which it appertains to make and use the same.

The present invention relates to driving and braking mechanism for bicycles and like vehicles and more particularly to a back pedaling free coasting and braking hub provided with a variable speed driving gear.

In my patent issued Dec. 7, 1909, No. 942520, for variable speed coasting and braking hubs, there is disclosed a back pedaling free coasting and braking hub provided with a variable speed driving gear, in which the mechanism for shifting from one speed to the other is controlled wholly by the pedals and in which the brake actuator serves also as a fixed element of a planetary gear arrangement for driving the hub at an increased speed with relation to the speed of the sprocket wheel. It is in some cases desirable that means independent of the pedals be employed for controlling the operations of the various driving clutches, for the reason that where manually operated mechanism is employed for this purpose, the manipulations of the pedals for permitting driving, coasting or braking remain the same as in the case of a simple back pedaling coaster brake.

The object of the present invention is to provide means independent of the pedals for determining at which of the two rates of speed the hub shall be driven.

A further object of the present invention is to improve the connection between the brake actuator and the braking element.

Further objects of the present invention will appear in connection with the following description thereof.

To the above ends the present invention consists in the devices and combinations of devices to be hereinafter described and particularly pointed out in the claims.

The present invention is illustrated in the accompanying drawings in which:—

Figure 1 is a longitudinal section through the hub containing my improvements showing all the parts assembled and the hub shell clutched directly to the driver. Fig. 2 shows in perspective the auxiliary driving sleeve having a portion thereof broken away, to disclose the intermediate clutch sleeve. Fig. 3 shows in perspective the clutch sleeve for connecting the driver directly with the hub shell. Fig. 4 is a perspective view of the driver. Fig. 5 is a side elevation of the expanding brake member having one of the retaining plates removed and showing the brake actuator in position. Fig. 6 is a side elevation of the brake supporting plate and anchoring arm showing the mechanism for operating the controller for the intermediate clutch sleeve. Fig. 7 is a side elevation showing the brake actuator and controller for the intermediate clutch sleeve in operative relation toward each other, a portion of the brake actuator being broken away to show the screw thread upon the sleeve. Fig. 8 shows in partial section and side elevation the intermediate clutch sleeve. Fig. 9 shows in side elevation one member of the clutch controller, a portion thereof being broken away to show one of the pins which engages with the screw thread on the clutch controlling sleeve.

Similar reference characters will be used throughout the specification and drawings to indicate like parts.

A indicates the hub shell having the usual flanges $a$ and $a^1$ for receiving spokes, and B represents the usual stationary axle which is supported within the rear fork of the bicycle and upon which the component parts of the hub mechanism are mounted. A driving sprocket or gear C, of any usual or desired form, is located adjacent one end of the hub and is screwed or otherwise secured to the driver $C^1$; the driver being supported at one end upon balls $c$ seated upon the cone bearing $c^1$. The driver is provided with an external bearing $c^2$ upon which are seated the hub supporting balls $c^3$. The sleeve $C^2$ of the driver projects within the hub and is provided with external screw threads or ribs $C^3$ having a sharp pitch.

Suitable braking mechanism D is located at the opposite end of the hub and consists preferably of a plurality of open spring rings $d$ adapted to be expanded against a braking surface $A^1$ within the brake drum $A^2$ of the hub shell. Lugs $d^1$ located near corresponding ends of the brake rings engage with studs $d^2$ which pass through the retaining plates $d^3$ and into the supporting plate $d^4$. The supporting plate is provided with an anchoring arm $d^5$ which is secured to a fixed portion of the bicycle frame. It is evident that through this arrangement one end of each brake ring abuts against a fixed stop, so that when pressure is applied to the other end of the ring, the ring can yield only by expanding and not by a bodily movement. Pivoted dogs $d^6$ project into the open spaces of the rings, and, by turning the dogs in one direction, the brake rings are expanded against the brake drum; while rotation of the dogs in the opposite direction is prevented by means of lips $d^7$ on the brake rings against which the dogs abut.

The dogs for expanding the brake rings are operated by the brake actuator $D^1$, about the periphery of which are formed gear teeth $D^2$ which are adapted to mesh with similar teeth $d^8$ upon the dogs. This toothed connection between the dogs and the brake actuator serves to give a uniform application of pressure upon the dogs as they are rotated, and furthermore, since the teeth $D^2$ extend throughout the circumference of the brake actuator, a very convenient means is afforded for assembling the parts, inasmuch as no particular attention need be given to the positioning of the brake actuator when it is set in place.

Two clutch sleeves, namely, the main clutch sleeve E and the intermediate clutch sleeve G, are mounted upon the driver sleeve $C^2$ and are provided with internal spiral grooves or threads $e$ and $g$, respectively, which mesh with the threads $C^3$ of the driver sleeve.

The exterior of the clutch sleeve E is cone-shaped so as to form a clutch face $E^1$ adapted to engage with a complementary clutch face $A^3$ within the hub shell. Upon forward pedaling the screw thread $C^3$ moves the clutch sleeve E laterally until it is forced into close contact with the clutch face on the hub shell, whereupon, upon a continued forward movement of the sprocket wheel, the hub shell travels with it and at the same speed. Upon holding the pedals stationary, while the hub shell continues to rotate and upon back pedaling, the clutch sleeve E is released from the hub shell, thereby permitting the hub shell to run independently of the driving mechanism.

The intermediate clutch sleeve G is formed with an interior flaring clutch face $G^1$ adapted to coöperate with a complementary clutch face $D^3$ upon the brake actuator $D^1$. The arrangement of the parts is such that upon turning the sprocket wheel in a forward direction the intermediate clutch sleeve G is moved laterally and away from the brake actuator a sufficient distance to keep the clutch faces $G^1$ and $D^3$ out of contact with each other; while upon backward pedaling the intermediate clutch sleeve is moved toward the brake actuator, bringing the two clutch faces into operative engagement, whereupon, upon a further backward turning of the sprocket wheel, the brake actuator is likewise turned in a backward direction, thereby rotating the dogs and applying the brake.

The mechanism for driving the hub shell at an increased speed consists of a sleeve F flanged at one end as at $F^1$ and provided with internal and external ball seats $f$ and $f^1$. Balls $f^2$ rest upon a bearing $d^9$ upon the brake actuator and engage with the seats $f$ to support the sleeve F, while a second set of balls $f^3$ rest upon the external seat $f^1$ and serve to support one end of the hub shell.

Upon the flange $F^1$ of the sleeve F are journaled a series of pinions $F^2$, these pinions being preferably mounted upon stub shafts $F^3$, passing through the flange $F^1$ and through an annular retaining plate $F^4$, the shafts being held to the flange in any suitable manner, as by means of pins $f^4$. The pinions $f^1$ are preferably supported on balls $f^5$ which are seated within bearings $f^6$ in the interior of the pinions and bearings $f^7$ and $f^8$ upon the stub shafts $F^3$ and collars $F^5$ respectively.

The gear teeth $D^2$ upon the brake actuator are made of a length sufficient, not only to accommodate the brake expanding dogs, but also to enable them to intermesh with the teeth upon the pinions when the parts are assembled. The pinions in turn mesh with the gear teeth $A^4$ within the hub shell.

The sleeve F and the intermediate clutch sleeve G are formed with complementary internal and external conical clutch faces $F^6$ and $G^2$ respectively. When otherwise free, a forward turning of the sprocket wheel causes the intermediate clutch sleeve G to be shifted laterally until the clutch faces $G^2$ and $F^6$ are brought into engagement, whereupon a further forward turning of the sprocket wheel results in driving the sleeve F at the same speed as that of the sprocket wheel, and therefore the hub shell at a high rate of speed, depending upon the proportion of the planetary gear system.

H is a controller for preventing the sleeve F from acting as a driving agent, except when it is desired that it shall so act. This controller consists of a sleeve H¹ slidingly mounted upon the axle, together with means for moving it to and fro. One end of this sleeve projects within the intermediate clutch sleeve G and is provided with a ball seat $h$ containing balls $h^1$ which project into an elongated seat $g^1$ within the clutch sleeve G. The balls $h^1$ serve as bearings to support the intermediate clutch sleeve and also, when in the position shown in Fig. 1, as a stop for holding the sleeve against lateral movement toward the clutch face F⁶ of the sleeve F.

When the parts are in the position shown in Fig. 1, the hub shell is driven directly from the driver C¹ at the same rate of speed as that of the driver. When it is desired to bring the auxiliary driving mechanism into play, the controller sleeve H¹ is moved toward the right, enabling the intermediate clutch sleeve G to be drawn farther upon the driving sleeve C² until the clutch faces G² and F⁶ contact with each other, whereupon the hub shell is driven at an increased speed in the manner heretofore described.

Any desired means may be employed for operating the sleeve H¹. Suitable mechanisms for this purpose, such as shown in the drawings, consist of a short sleeve H² nested within the outer end of the brake actuator and having pins $h^3$ or a screw thread engaging with a screw thread $h^4$ upon the end of the sleeve H¹. Upon the outer end of the sleeve H² are formed gear teeth $h^5$ (see Fig. 6) which intermesh with teeth $h^6$ upon a pivoted sector H³. The gear teeth $h^5$ form a shoulder upon the sleeve H² which abuts against the outermost retaining plate $d^3$, this construction holding the sleeve H² against lateral movement. The sector H³ is seated within a recess $d^{10}$ on the inner face of the supporting plate $d^4$ and is provided with a hub $h^7$ which projects through an opening $d^{11}$ in the adjusting plate. An arm H⁴ is secured to the hub of the sector without the supporting plate, the sector being thereby held securely in position upon the supporting plate and yet free to oscillate.

It is evident that an oscillation of the arm or lever H⁴ produces a corresponding motion in the sector and that the oscillation of the sector in turn partially rotates the sleeve H², thereby shifting the sleeve H¹ to the right or to the left according to the direction of movement of the arm or lever H⁴. When the sleeve H¹ is shifted to the right the intermediate clutch sleeve is released enabling the driver to shift the clutch sleeve laterally to clutch the driver to the auxiliary driver F. When it is desired to again resort to the low speed, the pedals are held stationary, whereupon the auxiliary driver releases itself from the intermediate clutch sleeve; and upon shifting the controller sleeve H¹ to the left, the intermediate clutch sleeve is positively held out of engagement with the auxiliary driving sleeve, and the hub may then be driven directly by means of the clutch E.

It is thought that the operation of the various elements has been described sufficiently in connection with the foregoing description of the elements themselves, and further description of the operation thereof is therefore deemed unnecessary.

Although the component parts of my improved mechanism have been described in detail in order to clearly disclose the present invention, I desire it to be understood that the present invention is not limited to such details of construction except to the extent that such details may be included in the appended claims.

Having described my invention, I claim as new and desire to protect by Letters Patent of the United States:—

1. The combination with a hub provided with a clutch, and a driver, of a shiftable clutch coöperating with said hub-clutch, shifting connection between said shiftable clutch and said driver, a shiftable controller for said shiftable clutch, a reciprocatory actuator for said controller, and threaded operating connection between said actuator and said controller; substantially as described.

2. The combination with a hub provided with a clutch, and a driver, of a shiftable clutch coöperating with said hub-clutch, shifting connection between said shiftable clutch and said driver, a shiftable controller for said shiftable clutch, a rockable collar provided with teeth and having threaded connection with said controller, and a toothed segment engaging the teeth of said collar; substantially as described.

3. The combination with a hub provided with a clutch, a driver, a brake plate, and a brake supported by said plate and coöperating with said hub, of a shiftable clutch coöperating with said hub-clutch, shifting connection between said driver and said shiftable clutch, a shiftable controller for said shiftable clutch, a reciprocatory actuator for said controller and mounted upon said brake plate, and shifting connection between said actuator and said controller; substantially as described.

4. The combination with a hub provided with a clutch, a driver, a brake plate, and a brake supported by said plate and coöperating with said hub, of a shiftable clutch coöperating with said hub-clutch, shifting connection between said driver and said shiftable clutch, a shiftable controller for said shiftable clutch, a collar rockably mounted upon said brake plate and having shifting connection with said controller, and a segment mounted upon said brake plate to reciprocate thereon and having operative connection with said collar; substantially as described.

5. The combination with an axle, a hub about the same and provided with a clutch, a driver, a brake plate, a brake supported thereby and coöperating with said hub, and a hollow brake actuator upon said axle, of a shiftable clutch coöperating with said hub-clutch, shifting connection between said shiftable clutch and said driver, a shiftable controller extending through said hollow brake actuator and having engagement with said shiftable clutch at one side of said brake actuator, and means at the other side of said brake actuator for shifting said controller; substantially as described.

6. The combination with an axle, a hub about the same and provided with a clutch, a driver, a brake plate, a brake supported thereby and coöperating with said hub, and a hollow brake actuator upon said axle, of a shiftable clutch coöperating with said hub-clutch, shifting connection between said shiftable clutch and said driver, a shiftable controller extending through said hollow brake actuator, and an actuator for said controller and also extending into the hollow of said brake-actuator; substantially as described.

7. The combination with an axle, a hub about the same and provided with a clutch, a driver, a brake plate, a brake supported thereby and coöperating with said hub, and a hollow brake actuator upon said axle, of a shiftable clutch coöperating with said hub-clutch, shifting connection between said shiftable clutch and said driver, a shiftable controller extending through said hollow brake actuator, a rockable collar held between said brake plate and said brake-actuator and having a portion extending into the hollow of said brake-actuator, and shifting connection between said collar and said controller; substantially as described.

8. Driving and brake mechanism having in combination a hub shell having internal gear teeth, a brake, a toothed brake actuator, a pivoted dog engaging with the brake member and meshing with the teeth of the brake actuator, and a pinion meshing with the teeth within the hub and those upon the brake actuator; substantially as described.

In testimony whereof I affix my signature, in presence of two witnesses.

ALBERT F. ROCKWELL.

Witnesses:
W. E. WIGHTMAN,
CHAS. R. RILEY.